March 11, 1958

L. PÉRAS 2,826,012

APPARATUS FOR CONTINUOUS CALIBRATION OF
MACHINING OPERATIONS ON MACHINE TOOLS

Filed Jan. 24, 1956

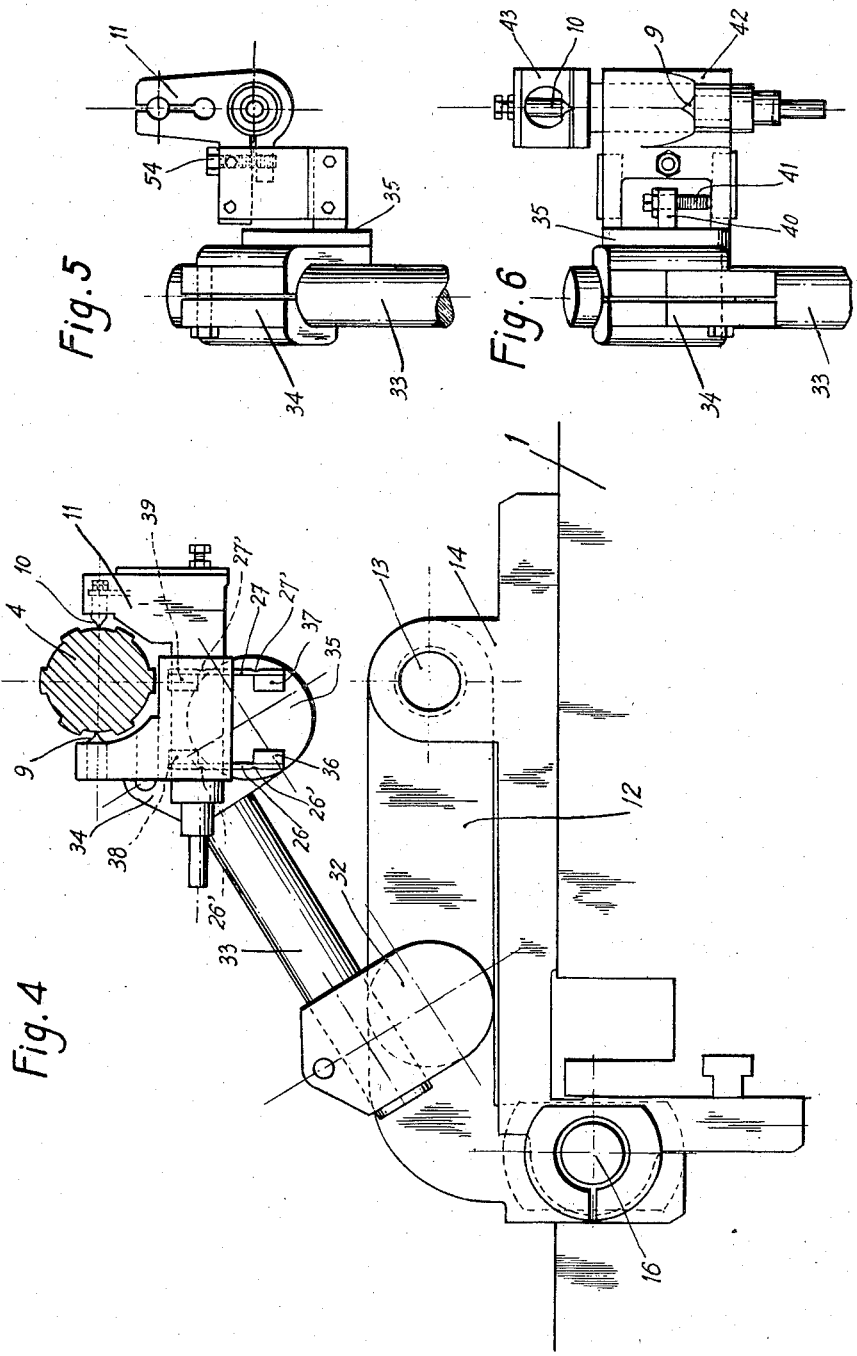

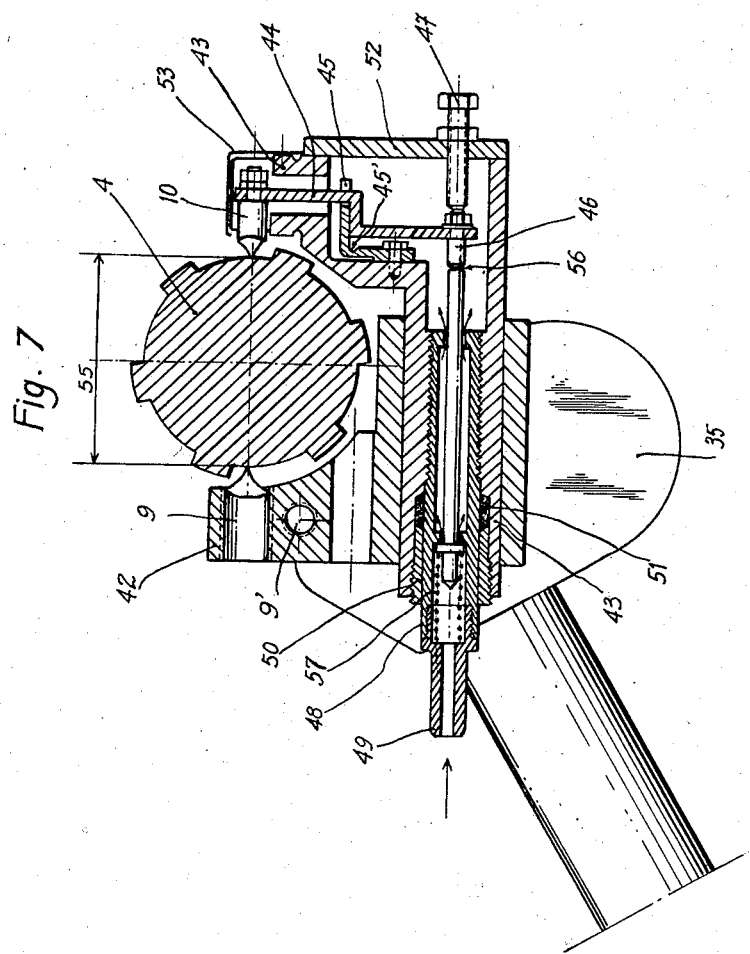

United States Patent Office 2,826,012
Patented Mar. 11, 1958

2,826,012

APPARATUS FOR CONTINUOUS CALIBRATION OF MACHINING OPERATIONS ON MACHINE TOOLS

Lucien Péras, Billancourt, France, assignor to Regie Nationale des Usines Renault, Billancourt, France, French Works under the Control and Authority of the French Government Application January 24, 1956, Serial No. 561,081

Claims priority, application France March 2, 1955

5 Claims. (Cl. 51—165)

The invention relates to apparatus for continuous calibration of machining operations on machine tools.

A high degree of precision in machining operations, especially in truing machines, can only be obtained by permanent checking of the development of the dimension being machined. Various known devices allow this permanent checking in truing operations on external surfaces of revolution.

A particular problem is raised as regards calibrating pieces of which the profile has projections, for example splined shafts during truing of the bases of the channels. In fact, after the tangent grinding wheel has passed into a hollow in the channels, the shaft rotates about its axis in order to present a new channel to the grinding wheel. On the other hand, if feelers were in permanent contact with the bases of the channels, this evolution of the splined shaft would become impossible in consequence of the existence of the projections. The depth of the channels is consequently usually checked manually by the operator by means of calipers.

The object of the invention is to provide an automatic work-sizing-device or apparatus giving automatic and permanent calibration of surfaces in course of machining on pieces of which the profiles have projections. According to the invention, relative movement is set up between the piece to be machined and the calipers, this relative movement being such that the calibration sweeps the whole length of the piece, and ceases at the end of each reciprocating movement of the table of the machine longitudinally outside the projecting profile, in such a way as to allow the piece to be rotated. Means are furthermore provided to ensure contact between the feelers of the calipers and the piece, and also to amplify the differences in dimensions shown by the calipers, and to use the differences with a view to establishing an automatic machining cycle.

A device according to the invention, used in calibrating truing operations on bases of channels, will now be described by way of non-limitative example, and with reference to the attached drawings, wherein:

Fig. 4 is an overall view of the calibrating device;

Fig. 5 is a left-hand view of certain elements in Fig. 4;

Fig. 6 is a plan view of certain elements in Fig. 4;

Fig. 7 is a sectioned view of the calipers alone.

Figure 1:
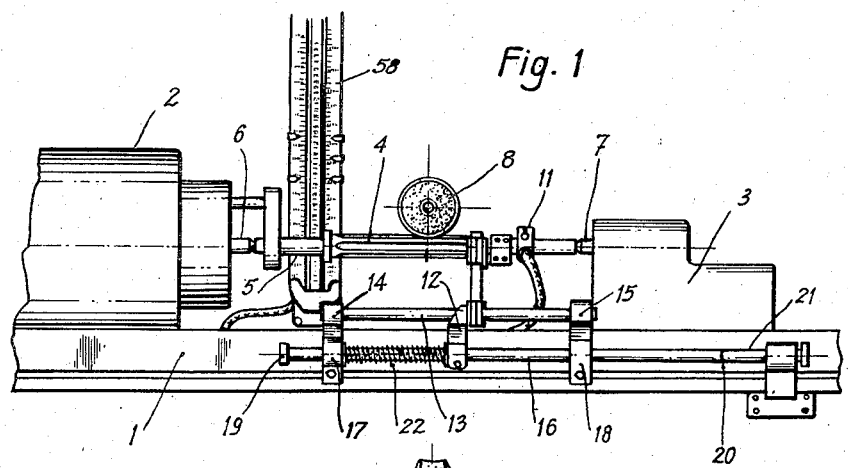
Fig. 1 is a diagrammatic elevation of a channel truing machine equipped with the calibrating device.
Figure 2:
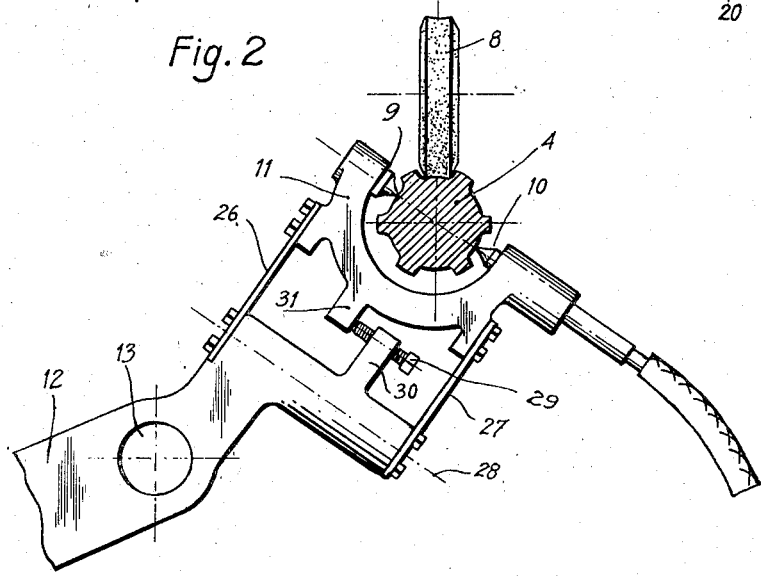
Fig. 2 is a side view of the calipers alone.

The principle of the apparatus is diagrammatically shown in Fig. 1. There will be recognised the table 1 of a channel truing machine, this table carrying the fixed division head stock 2 and the movable head stock 3, the splined shaft to be trued being supported by a mounting 5 between the two points 6 and 7 of the head stocks. The table 1 moves alternatively in the longitudinal direction under the grinding wheel 8, which only trues the base of the channels, as shown in Fig. 2. At the end of each feed and return stroke, the table 1 moves in such a way as to disengage the grinding wheel from the channels, and the dividing mechanism contained in the head stock 2 causes the piece 4 to rotate in such a way that the grinding wheel can engage in the following channel.

The calibrating device is represented in part in Fig. 2. It comprises a fixed feeler 9 and a movable feeler 10, and allows the dimension at the bottom of the channels to be indicated by means of an amplifier of any kind, pneumatic in the example under consideration. It will be seen that the calipers 11 with their two feelers 9 and 10 must be withdrawn in order to allow the splined shaft 4 to rotate when the grinding wheel 8 is to come into action in a new channel.

The calipers 11 are fast for this purpose with a support 12 sliding on a bar 13 attached to the table 1 by two supports 14 and 15 (Fig. 1), the support 12 being furthermore fast with a bar 16 sliding in two bearing blocks 17 and 18 formed in the supports 14 and 15. The bar 16 furthermore carries a washer 19 at one end, and its opposite end 20 abuts, at certain positions of the table, against an adjustable abutment 21 attached to the frame of the machine. A spring 22 is situated between the support 14 and the caliper support 12.

The device operates as follows: When the table is in its extreme left position, the calipers 11 are completely disengaged from the splined shaft 4, and to the right thereof. In fact, the spring 22 is then completely extended, and holds the support 12 away from the support 14, at a distance equal to the maximum length of the spring 22. When the table 1 moves to the right, the bar 16 meets the abutment 21, and the calipers 11 are prevented from moving in relation to the machine frame and the splined shaft 4, which, being carried by the table, then moves between the feelers 9 and 10, and under the grinding wheel 8. The spring 22 is thus compressed. The table carries out its return stroke, from right to left, and the spring 22 prevents the calipers 11 from moving until they are again disengaged to the right of the splined shaft 4, from which instant the support 12 can follow the stroke of the splined shaft, the bar 16 being driven to the left by the support 14 abutting against the washer 19.

Figure 3:
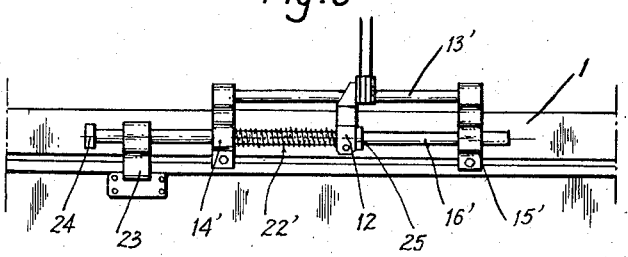
Fig. 3 is an elevation corresponding to Fig. 1, wherein the calibrating device is in accordance with a different method of embodiment of the invention.

A different method of embodiment of the device according to the invention is represented in Fig. 3. The support 12 is likewise carried in this case by a bar 13' and a bar 16'. It slides freely on these two elements, the bar 13' being fast with the table 1 of the machine, and the bar 16' in turn sliding freely between the supports 14' and 15' attached to the table and a fork 23 fitted to the frame of the machine. The bar 16' carries two washers 24 and 25 and a spring 22' situated between the support 14' and the support 12 of the calipers. When the table moves to the right of the Fig., it drives with it, by way of the spring 22', the support 12 until the washer 24 abuts against the fork 23. The table 1 then continues on its stroke, while the caliper support 12 is prevented from moving, and the spring 22' compressed. During the return stroke of the table, the support 12 remains first of all stationary until the spring 22' is extended, in which position the feelers 9 and 10 have left the channels, and allow the splined shaft 4 to revolve.

The calipers 11 (Fig. 2) are fast with their support 12 via two flexible blades 26 and 27, through which an articulated parallelogram is formed, the axis passing through the two feelers 9 and 10 always remaining parallel to the axis 28 of the support 12, the feeler 9 being always moved towards the piece to be trued. The screw 29, carried by an ear 30 on the support 12, holds the calipers 11, when the feeler 9 is not in contact with the splined shaft, by abutting against a tail 31 on the calipers.

A method of embodiment of the arrangement of the calipers 11 and their support 12 is represented in detail in Figs. 4, 5 and 6. The support 14 carrying the two bars 13 and 16 is attached to the table 1 (Fig. 4) of the truing machine. The caliper support 12, comprising a head 32 supporting an arm 33 at the end of which a head 34 is provided, slides on these bars. A plate 35 is so atttached to the head 34 as to be capable of being angularly orientated about the transverse axis of the head. The plate 35 has two ears 36 and 37 to which are attached the two flexible blades 26 and 27 having thinned portions 26′ and 27′, and being fast at opposite ends with two ears 38 and 39 carried by the calipers 11. The plate 35 furthermore has an ear 40 (Fig. 6) carrying an adjusting screw 41, abutting against one of the ears of the calipers 11, thus allowing the position of the feeler 9 to be adjusted in relation to the axis of the splined shaft. The thinned portions 26′ and 27′ (Fig. 4) allow the blades 26 and 27 to deflect suitably.

The calipers 11 are represented in detail in Fig. 7. They consist chiefly of a fixed part 42 fast with the plate 35 via the flexible blades 26 and 27 (Fig. 4), and of a moving part or amplifying support 43. The fixed feeler 9 is screwed into the feeler-carrier 42, and locked after adjustment by a screw 9′. The support 43 slides in a corresponding bore in the feeler-carrier, and carries the movable feeler 10. The latter is attached to the upper end of a lever 44, which is fast with a spring 45, the lower end of the lever carrying a feeler 46. This end of the lever 44 abuts against an adjustment screw 47. The movable feeler support 43 furthermore contains a pneumatic amplifier 48 of known type provided with a projection 49 connected by flexible piping to a source of compressed air. The end 56 of the valve rod of the amplifier bears against the feeler 46 because of the spring 57. The screw 48 is locked by means of a threaded cap 50 and a packing washer 51. A plate 52 blanks off the amplifier support, and a cover 53 protects the upper part thereof against dust. The calipers 11 are represented in the horizontal position in Figs. 4 and 7, but they will naturally be inclined during calibration by rotation about the axis of their plate 35. The amplifier support 43 is held fast by the grip of the screw 54 (Fig. 5).

The appliance operates as follows: The abutments of the bar 16 (or 16′) (Figs. 1 and 3) being suitably adjusted, the calipers 11 sweep over the whole length of the splined piece being trued during the reciprocating movement of the table, plus a certain distance outside the channels, which allows the splined shaft to be rotated through a certain angle. The spacing of the feelers 9 and 10 is adjusted on a specimen splined shaft serving as a standard by sliding of the amplifier support 43, and consequently of the feeler 10 in the fixed feeler-support, this sliding being made possible by releasing the screw 54.

When the caliper 11 is placed on an untrued piece, the distance 55 separating the feelers 9 and 10 is greater than that adjusted on the specimen piece. The lever 44 then pivots about the weakened portion 45, deflection of the spring 45, and the feeler 46, which bears against the end 56 of the valve of the amplifier 48, determines an air leak from the latter. The air leak from the amplifier decreases in proporton as the dimension 55 decreases in consequence of the downward movement of the grinding wheel.

Advantage is taken of these variations in air leak in known manner in a double-reading "bottle" or a manometric reading appliance 58 (Fig. 1), which indicates variations in the dimension 55 (Fig. 7) to the operator, the operator stopping the machine when the dimension adjusted on the specimen piece is reached on the piece in course of truing.

I claim:
1. In combination with a machine having a reciprocable means for moving a work-piece reciprocably in a longitudinal direction, the work-piece having peripheral spaced, longitudinal recesses and a tool for successively engaging the work-piece along said longitudinal recesses, an improved automatic work-sizing device for continuously and successively gauging the transverse dimension of the work-piece at selected points between diametrically opposed longitudinal recesses, the sizing device comprising a caliper gauge disposed for gauging the transverse dimension of the work-piece, support means fixed to the reciprocable means for supporting the caliper gauge, means slidably mounted on said support means for holding the caliper gauge, an extensible and contractible member disposed to cooperate with said gauge support means and the holding means for holding the gauge substantially without relative movement between it and the machine regardless of the reciprocable movements of the reciprocable means, abutment means for defining the relative movement between the slidable means for holding the caliper gauge and the machine, the reciprocable means being adapted to move the work-piece in a longitudinal movement in a direction for engaging the work-piece with the gauge calipers and in an opposite direction for disengaging it from the caliper gauge, whereby when the reciprocable means moves the work-piece in a direction for engaging the caliper gauge, the slidable holding means engages the abutment means so that the gauge is held from moving and the extensible and compressible member is compressed by the support means and the holding means and when the reciprocable means moves in an opposite direction the extensible and compressible member is permitted to extend and maintain the gauge slidable holding means in substantially a stationary position relative to the machine.

2. A combination according to claim 1, in which the machine includes means to rotate the work-piece when out of engagement with the caliper gauge and means for selectively engaging and disengaging the tool with the work-piece so as to permit rotation of the work-piece when disengaged from the gauge.

3. A combination according to claim 1, in which the reciprocable means comprises a reciprocable table, the caliper support means comprising a plurality of bearing blocks fixed to the table and in which said slidable means is provided with an extension fixed thereon for holding the gauge and the extensible and contractible member comprises a spring disposed between one of said bearing blocks and said extension.

4. A combination according to claim 1, in which the caliper gauge includes a support member having a portion inclined relative to a plane passing through the longitudinal axis of the work-piece, said portion having a central axis, feeler means disposed in a plane substantially parallel to said central axis, a plurality of spaced flexible blades connected to the inclined portion so as to be disposed in planes forming a parallelogram with said central axis and the plane in which the feeler means is disposed, whereby the feeler means is disposed for engaging the work-piece radially and the maintain contact with recessed surfaces on the work-piece defining a dimension being gauged.

5. In a combination according to claim 1, in which said caliper gauge comprises a fixed feeler and a movable feeler, the movable feeler being fixed on a movably mounted lever, resilient means biasing the movable feeler into engagement with the work-piece, a pneumatic amplifier valve disposed so as to be actuated by the movable feeler.

References Cited in the file of this patent
UNITED STATES PATENTS
2,521,979   Jagen _____ Sept. 12, 1950